May 12, 1970     C. C. GAMBILL     3,512,148
FREEZER WARNING SYSTEM
Original Filed Aug. 2, 1965     2 Sheets-Sheet 1
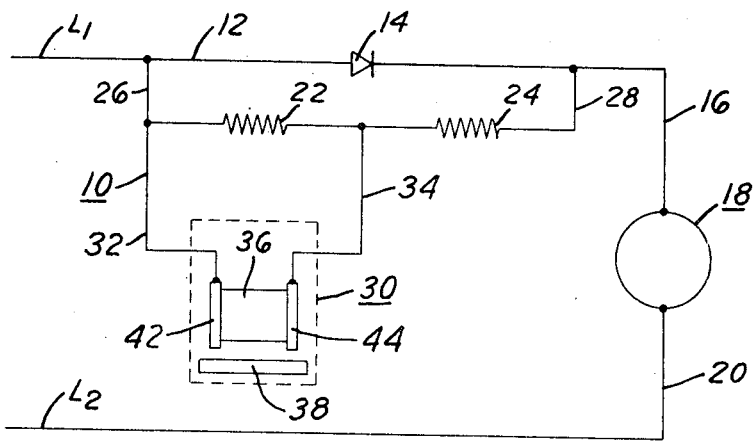
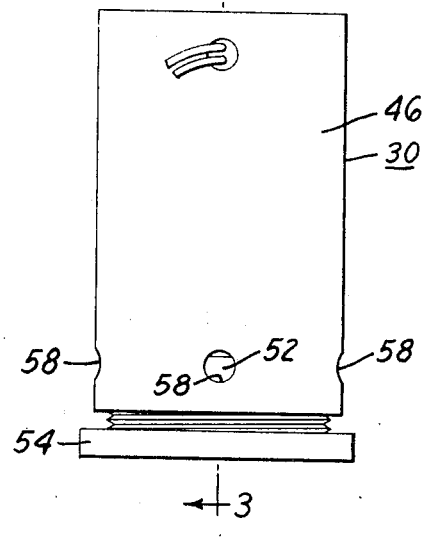
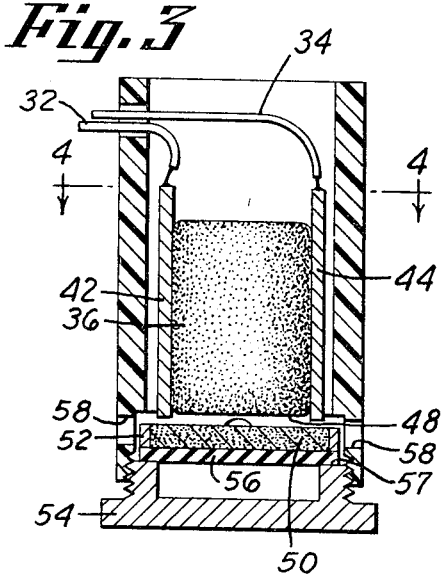
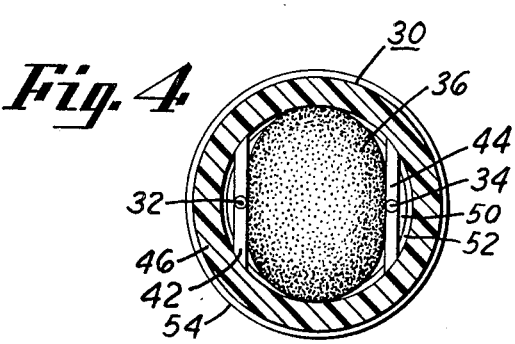
INVENTOR.
CHARLES C. GAMBILL
BY
J. C. Evans
ATTORNEY May 12, 1970

C. C. GAMBILL 3,512,148

FREEZER WARNING SYSTEM

Original Filed Aug. 2, 1965

INVENTOR.
CHARLES C. GAMBILL
BY
J. C. Evans
ATTORNEY

United States Patent Office 3,512,148
Patented May 12, 1970

3,512,148
FREEZER WARNING SYSTEM
Charles C. Gambill, Kokomo, Ind., assignor to General Motors Corporation, Detroit, Mich., a corporation of Delaware
Original application Aug. 2, 1965, Ser. No. 476,396, now Patent No. 3,430,166, dated Feb. 25, 1969. Divided and this application Aug. 5, 1968, Ser. No. 750,364
Int. Cl. G08b 17/00; H01h 37/58
U.S. Cl. 340—228                                3 Claims

ABSTRACT OF THE DISCLOSURE

In preferred form, a domestic freezer warning system including a first indicating light in an energization circuit including thermally responsive switch means that maintains the first indicating light on when a freezer compartment is below a desired operating temperature. A second warning light is also operated by the thermally responsive switch and is off when the first light indicates a safe freezer temperature. When the temperature in the freezer compartment rises above a predetermined temperature, the thermally responsive switch turns the indicating light off and concurrently turns the warning light on. The thermally responsive switch means has an electrically conductive armature having magnetic properties exhibiting the Curie effect. The armature is adjustably disposed in the field of a permanent magnet.

---

This is a division of Ser. No. 476,396, filed Aug. 2, 1965, now Pat. No. 3,430,166.

This invention is directed to electrical control circuits and more particularly to electrical control circuits including thermally responsive electrical switches.

In the control of many electrical systems, it is desirable to include temperature responsive switches therein to condition the electrical control system in response to temperature for varying the controlling action thereof. Such switches take a wide variety of forms that can utilize thermally expansible polymetallic members, thermally expansible fluids and solids and the like to sense and respond to temperature so as to make and break contact pairs.

An object of the present invention is to improve thermally responsive switches by the provision therein of a movable, electrically conductive member that has a magnetic inversion point at a predetermined temperature wherein the member is movable by the field of a permanent magnet to complete an electrical circuit through the conductive member.

A further object of the present invention is to improve temperature responsve switches by the provision of an electrically conductive member that is selectively movable at a predetermined temperature in response to the field of a permanent magnet to open a first predetermined circuit and to close a second predetermined circuit through the conductive member.

A further object of the present invention is to indicate a safe and high temperature range in a freezer compartment by a light warning system including a single thermally responsive switch that accurately reflects the temperature condition in the compartment and includes a single movable sensing and conducting element for switching a safe range indicating light on during normal operation and for switching it off when the freezer compartment temperature exceeds a predetermined point; the single movable sensing and conducting element concurrently energizing a warning light to indicate the temperature increase.

Further objects and advantages of the present invention will be apparent from the following description, reference being had to the accompanying drawings wherein preferred embodiments of the present invention are clearly shown.

Figure 5:
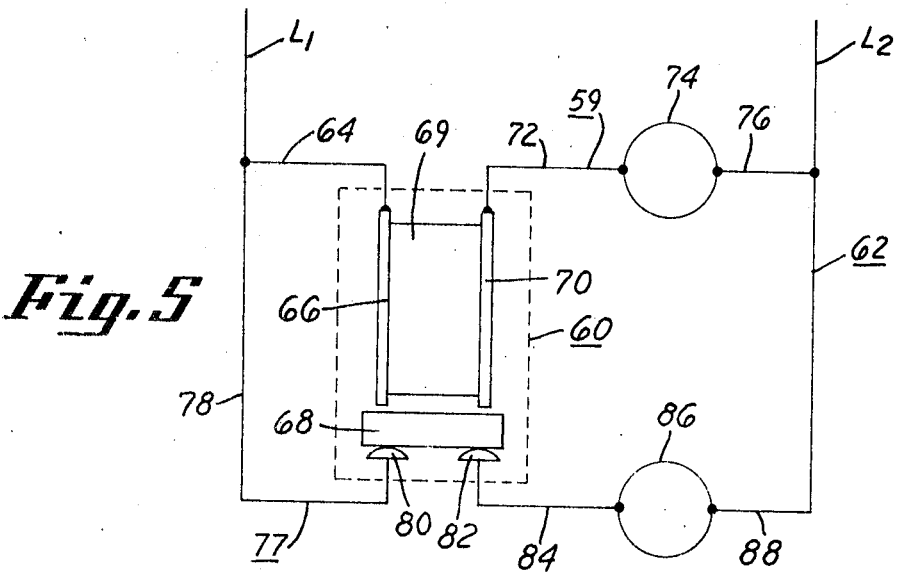
Figure 6:
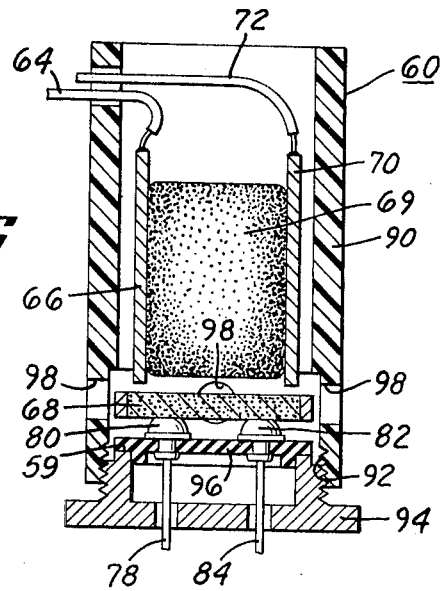

In the drawings:
FIG. 1 is a diagrammatic view of an electrical motor speed control circuit including the switch of the present invention;
FIG. 2 is a view in elevation of the improved switch;
FIG. 3 is a view in vertical section taken along the line 3—3 of FIG. 2;
FIG. 4 is a view in horizontal section taken along the line 4—4 of FIG. 3;
FIG. 5 is a diagrammatic view of an electrical warning system including another embodiment of the switch of the present invention; and
FIG. 6 is a view in vertical section of the modified switch in FIG. 5.

Referring now to the drawings, in FIG. 1 a motor speed control circuit 10 is illustrated including wires $L_1$, $L_2$ of a suitable source of alternating current power. The wire $L_1$ is connected to a conductor 12 having a diode 14 therein which is connected by a conductor 16 to one end of the winding of an induction-type motor 18. The opposite end of the winding is connected by a conductor 20 to the wire $L_2$. Resistors 22, 24 are electrically connected across the diode 14 by conductors 26 and 28. The resistor 22 is selectively shunted by a temperature responsive switch 30 connected thereacross by conductors 32, 34. The switch 30 includes a permanent magnet 36 and a movable conductive member 38 responsive to a predetermined temperature to be conditions so as to be attracted by the permanent magnet 36 into electrical contact with terminals 42 and 44, respectively, connected to the conductors 32 and 34 so as to shunt the resistance 22.

The control system 10 relies upon dynamic braking to control speed of motor 18 in the following manner. During a first predetermined temperature range when the switch 30 is open, the combined resistances of resistors 22, 24 produce a predetermined magnitude of alternating current and direct current components across the winding of the motor 18 to produce a first predetermined speed output therefrom. When the resistance 22 is shunted, the resulting half-wave rectified current across the diode 14 is modified to produce a dynamic braking effect different than was previously the case so as to result in a second predetermined operation of the motor 18. The principle of dynamic braking forms no part of the present invention and for a more explicit explanation of such speed control, reference is made to U.S. Pat. No. 2,419,431, issued Apr. 22, 1947.

In accordance with certain of the principles of the present invention, however, the variation of the direct current power component across the diode 14, as effected by shunting the resistor 22, is accomplished by means of an improved temperature responsive switch 30 which is particularly set forth in FIGS. 2 through 4 as including in addition to permanent magnet 36, the movable temperature responsive conductive member 38 and the terminals 42, 44, as set forth above, a tubular outer housing 46 constructed of a suitable electrical insulating material. The permanent magnet 36 is of cylindrical form and consists of a resilient electrically insulating base material embedded with ferrites. The cylindrical permanent magnet 36 has sufficient resiliency to spring bias the terminal plates 42, 44 into press fit engagement with the inner surface of the outer housing 46, as best seen in FIG. 4. The magnet 36 is the illustrated arrangement has the bottom end 48 thereof located in close spaced relationship with the bottom ends of the terminals 42, 44 at a location spaced inwardly of their ends. Below the terminals 42, 44 is located an electrically conductive member 50 of the type that has a magnetic inversion at a predetermined temperature. A preferred material is chrome modified manganese antimonide of the general formula $Cr_xMn_{2-x}Sb$ that has an unusually sensitive transition temperature below which it is nonmagnetic and above which it becomes magnetically responsive. In the illustrated arrangement, the conductive member 50 includes an outer ring 52 of a good electrically conductive material. The member 50 is located in spaced relationship below the ends of the electrically conductive terminals 42, 44 by an adjusting member or screw 54 axially movable within an end of housing 46. The adjusting screw 54 has a seating surface 57 which is perpendicular to the axis of housing 46. The adjusting screw 54 in the illustrated arrangement is electrically insulated from the conductive member 50 by a spacer 56. Spacer 56 and conductive member 50 rest on seating surface 57 perpendicular to the axis of housing 46. The housing includes a plurality of circumferentially located openings 58 therein through which convective air currents can pass to vary the temperature of the conductive member 50.

Thus, in cases where the control circuit 10 varies the speed of a fan motor in an air conditioner, the housing 46 of the switch 30 can be located within the room being cooled by the air conditioner whereby the air in the room can pass through the openings 58 into heat transfer relationship with the conductive member 50. Upon the occurrence of a predetermined temperature in the room, the conductive member 50 will become magnetized and will thereby be attracted by the permanent magnet 36 upwardly against the terminals 42, 44 whereby the resistance 22 will be shunted to vary the speed of the motor 18 in response to the predetermined temperature in the room to vary the amount of cooled air being circulated in the room. The ring 52 assures good electrical contact between the member 50 and the terminals 42, 44 and, while preferred, can be omitted in certain switch arrangements.

When the temperature of the room drops below the predetermined temperature, the conductive member 50 will be rendered nonmagnetic and thereby will drop away from the permanent magnet into the position shown in FIG. 3 whereby the resistor 22 will be included in the control circuit 10 to vary the speed of operation of the motor 18 to produce a different cooling effect from an associated system such as an air conditioner.

In accordance with certain other of the principles of the present invention in FIG. 5, a modified temperature responsive switch 60 is shown in association with a warning or indicator circuit 62 connected across wires $L_1$, $L_2$ of a suitable alternating power source. In this arrangement, a first electrically energizable indicating circuit 59 is included that has a conductor 64 connected to the wire $L_1$ which in turn is connected to an electrical conductor strip 66 which is operatively associated with a temperature responsive magnetizable conductor disc 68 like member 50 in the first embodiment. The circuit 59 also includes an electrically conductive strip 70 which in turn is connected by a conductor 72 to a warning light 74 which is connected by a conductor 76 to wire $L_2$. The circuit 62 further includes a warning circuit 77 including a conductor 78 from wire $L_1$ that is electrically connected to a contact 80 which is operatively associated through the conductor disc 68 with another contact 82 that is electrically connected by a conductor 84 to a second warning light 86 which is connected to the wire $L_2$ by a conductor 88.

In this embodiment of the invention, the temperature responsive conductor disc 68 is a material such as that discussed in the first embodiment that is normally nonmagnetic below a predetermined temperature and ferromagnetic above said predetermined temperature. Accordingly, the switch 60 can be arranged within a freezer compartment so that the conductive disc 68 will sense the temperature of the air in the freezer compartment and be responsive thereto in the following manner.

When the temperature is below a predetermined point, the disc 68 will assume a position as shown in FIG. 5 to complete a circuit across contacts 80, 82 whereby the light 86 will be energized to indicate that the temperature of the freezer compartment is in a safe operating range. When the temperature in the freezer compartment increases above a predetermined temperature, the disc 68 will be rendered magnetizable and thereby will be attracted by a permanent magnet 69 out of electrical contact with the contacts 80, 82 to turn off the light 86 and move into electrical contact with the conductor strips 66, 70 to energize the light 74 to indicate that the temperature of the freezer compartment is above its desired operating range.

The switch 60 is more particularly illustrated in FIG. 6 as including a tubular housing 90 of a suitable electrical insulating material having an opened end 92 into which is movably secured on adjusting member or screw 94. The adjusting screw 94 has a seating surface 95 which is perpendicular to the axis of housing 90. The adjusting screw 94 has an electrical insulating member 96 on the seating surface 95 thereof which carries the contacts 80, 82. When the conductive disc member 68 is conditioned as shown in FIG. 5, it is supported by the contacts 80, 82 as shown in FIG. 6 to be in spaced relationship and out of electrical contact with the conductor discs 66, 70. The tubular housing 60 includes a plurality of circumferentially spaced openings 98 therein like the openings 58 in the first embodiment whereby air surrounding the housing 60 is free to pass into heat exchange relationship with the disc 68 for varying the temperature thereof to change the magnetic properties thereof. In this embodiment, as was the case in the embodiment of FIGS. 2 through 4, the conductor strips 66, 70 are biased into press fit engagement with housing 60 by the permanent magnet 69 which is of a resilient electrical insulating material including embedded ferromagnetic particles therein.

While the embodiments of the present invention as herein disclosed constitute preferred forms, it is to be understood that other forms might be adopted.

What is claimed is:

1. In an electrical warning system for a freezer compartment, the combination of, first circuit means having a first electrically energizable indicating means therein, a first pair of spaced, open contacts in said first circuit means connected to a source of power for energizing said first indicating means, second circuit means having a second electrically energizable indicating means therein, a second pair of spaced, open contacts in said second circuit means connected to the source of power for energizing said second indicating means, a permanent magnet, a single temperature responsive electrically conductive member disposed between said first and second pairs of contacts for sensing the temperature in the freezer compartment being non-magnetic below a first predetermined temperature and magnetic above said first predetermined temperature, said electrically conductive member being held by said permanent magnet in electrical contact with said first pair of contacts when said conductive member has a temperature above said predetermined temperature to bridge said first pair of contacts to define a current path to energize said first indicating means, said electrically conductive member being movable into electrical contact with said second pair of contacts when its temperature is below said first predetermined temperature to bridge said second pair of contacts to define a current path to energize the second indicating means while concurrently de-energizing said first indicating means.

2. In an electrical warning system for a freezer compartment, the combination of, first circuit means having a first electrically energizable indicating means therein, a first pair of spaced, open contacts in said first circuit means connected to a source of power for energizing said first indicating means, second circuit means having a second electrically energizable indicating means therein, a second pair of spaced, open contacts in said second circuit means connected to the source of power for energizing said second indicating means, a permanent magnet, a single temperature responsive electrically conductive member disposed between said first and second pairs of contacts for sensing the temperature in the freezer compartment being non-magnetic below a first predetermined temperature and magnetic above said first predetermined temperature, a housing enclosing said first and second pairs of contacts, said permanent magnet and said conductive member, said electrically conductive member being held by said permanent magnet in electrical contact with said first pair of contacts when said conductive member has a temperature above said predetermined temperature thereby to energize said first indicating means, said electrically conductive member being movable into electrical contact with said second pair of contacts when its temperature is below said first predetermined temperature to energize the second indicating means, means for supporting said second pair of contacts on said housing in adjustably spaced relationship to said first pair of contacts and said permanent magnet to calibrate the effect of said permanent magnet on said conductive member, said temperature responsive electrically conductive member being normally supported on said second pair of contacts in bridging relationship therewith to define a current path, when said conductive member is at a temperature below said predetermined temperature, said conductive member being lifted from said second pair of contacts and attracted upwardly thereof by said permanent magnet into electrical bridging contact with said first pair of contacts to define a current path thereacross at a temperature above said predetermined temperature.

3. In an electrical warning system for a freezer compartment, the combination of, first circuit means having a first electrically energizable indicating means therein, a first pair of spaced, open contacts in said first circuit means connected to a source of power for energizing said first indicating means, second circuit means having a second electrically energizable indicating means therein, a second pair of spaced, open contacts in said second circuit means connected to the source of power for energizing said second indicating means, a housing, said first pair of contacts being formed as elongated electrically conductive strips located within said housing on either side thereof, a permanent magnet of electrical insulating material, located between said strips for holding said strips within said housing and electrically insulating therebetween, a single temperature responsive electrically conductive member disposed between said first and second pairs of contacts within said housing for sensing the temperature in the freezer compartment being non-magnetic below a first predetermined temperature and magnetic above said first predetermined temperature, said electrically conductive member being held by said permanent magnet in electrical contact with said first pair of contacts when said conductive member has a temperature above said predetermined temperature to bridge said strips to define a current path to energize said second indicating means, said electrically conductive member being axially movable of said housing into electrical contact with said second pair of contacts when its temperature is below said first predetermined temperature to bridge said second pair of contacts to define a current path to energize the second indicating means, means including a threaded member engaging said housing for supporting said second pair of contacts in adjustably spaced, axially aligned relationship to said first pair of contacts and said permanent magnet for calibrating the effect of said permanent magnet on said conductive member.

References Cited

UNITED STATES PATENTS

| | | |
|---|---|---|
| 822,323 | 6/1906 | Thomson. |
| 1,655,847 | 1/1928 | Siebs. |
| 2,540,527 | 2/1951 | Ingels _____ 340—228 |
| 3,206,573 | 9/1965 | Anderson et al. ____ 335—146 X |
| 3,261,945 | 7/1966 | Gangler _____ 335—208 |
| 2,719,197 | 9/1955 | Hall et al. _____ 340—228 X |
| 3,028,586 | 4/1962 | Reda _____ 340—227 |
| 3,295,120 | 12/1966 | Witchie _____ 340—227 |

JOHN W. CALDWELL, Primary Examiner

D. L. TRAFTON, Assistant Examiner

U.S. Cl. X.R.

335—146, 208; 340—227